United States Patent
White

(10) Patent No.: US 6,974,908 B2
(45) Date of Patent: Dec. 13, 2005

(54) ADJUSTABLE AERIAL TERMINAL

(75) Inventor: Isaac Daniel McIntosh White, Orlando, FL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 161 days.

(21) Appl. No.: 10/199,638

(22) Filed: Jul. 19, 2002

(65) Prior Publication Data
US 2004/0035602 A1 Feb. 26, 2004

(51) Int. Cl.[7] .............................................. H02G 3/08
(52) U.S. Cl. ........................... 174/50; 174/53; 174/58; 220/3.2; 220/3.8; 248/906
(58) Field of Search ......................... 174/50, 48, 53, 174/57, 58, 61, 17 R, 45 R, 40 R, 59, 92, 174/63; 248/122.1, 125.7, 128, 906, 219.4, 248/230.8, 230.9, 241; 220/3.7, 3.9, 4.02, 220/3.8, 3.2, 3.3; 385/134, 135

(56) References Cited

U.S. PATENT DOCUMENTS

| | | | | |
|---|---|---|---|---|
| 1,156,885 A | * | 10/1915 | Caine | 248/906 |
| 1,592,990 A | * | 7/1926 | Raquette et al. | 248/906 |
| 1,675,602 A | * | 7/1928 | Faust | 174/59 |
| 1,800,813 A | * | 4/1931 | Sommerville | 174/63 |
| 2,316,389 A | * | 4/1943 | Atkinson | 248/906 |
| 2,670,919 A | * | 3/1954 | Esoldi | 248/906 |
| 2,956,106 A | * | 10/1960 | Hasselhorn et al. | 174/59 |
| 4,647,715 A | * | 3/1987 | Butler | 174/92 |
| 4,747,506 A | * | 5/1988 | Stuchlik, III | 248/906 |
| 4,757,967 A | * | 7/1988 | Delmore et al. | 248/906 |
| 4,818,824 A | * | 4/1989 | Dixit et al. | 174/92 |
| 4,934,644 A | * | 6/1990 | Nagy et al. | 248/906 |
| 4,967,990 A | * | 11/1990 | Rinderer | 248/906 |
| 4,984,705 A | * | 1/1991 | Assal | 220/3.2 |
| 4,992,627 A | * | 2/1991 | Mullaney | 220/3.8 |
| 5,247,135 A | * | 9/1993 | Rebers et al. | 174/92 |
| 5,426,577 A | * | 6/1995 | Gordin et al. | 174/45 R |
| 5,696,864 A | * | 12/1997 | Smith et al. | 385/135 |
| 6,096,973 A | * | 8/2000 | Kluska et al. | 174/40 R |
| 6,185,303 B1 | * | 2/2001 | Losey | 248/219.4 |
| 6,486,399 B1 | * | 11/2002 | Armstrong et al. | 174/58 |

* cited by examiner

Primary Examiner—Angel R. Estrada
(74) Attorney, Agent, or Firm—Bambi F. Walters; Walters & Zimmerman

(57) ABSTRACT

Apparatus, systems, and methods provide an adjustable aerial terminal that is capable of being pole-mounted or wall-mounted. In an embodiment, this invention includes an aerial terminal having the means to rotationally adjust positions about a curved surface. In another embodiment, this invention includes an aerial terminal having the means to longitudinally adjust positions along a planar surface. In further embodiments, this invention includes a kit-of-parts capable of being assembled with conventional aerial terminals and also includes a method of adjusting aerial terminals located at an elevated position.

20 Claims, 14 Drawing Sheets

ADJUSTABLE AERIAL TERMINAL

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND OF THE INVENTION

1. Field of the Invention

This invention relates generally to the field of telecommunications, and, in particular, to an adjustable aerial terminal.

2. Description of the Related Art

Conventional aerial terminals are terminals mounted at an elevated position for distributing communication signals from one or more routing cables to customers via drop wires. As used herein, the term "communications signals" includes telephony, video, cable, and any other electromagnetic signals including broadband signals and interactive signals that can be carried over a communications cable. As used herein, the term "routing cables" include cables that are routed from a central office or other location (e.g., a crossbox) to a wire center or a turf that is within a local geographical area of a called telephone number. Typically, a routing cable includes multiple cables bundled together into one cable and surrounded by a protective sheath so that the resulting routing cable may be easily and securely routed over long distances. As used herein, the term "drop wires" includes wires that are connected with a customer's premises, such as twisted-pair drop, F-drops, C rural drops, coaxial cable, Category 3, 5, and 7 cables, and/or other wires routed from aerial terminals. These drop wires may be connected directly with a communications device, such as a telephone, or more typically, the drop wires may be coupled with other wires integral with the customer's premise to eventually connect with the customer's communications device.

A common technique for connecting routing cables and drop wires is by terminating the routing cable and splicing it with the drop wire in a terminal or other appropriate telecommunications closure. As used herein, the term terminal includes terminals, closures, enclosures, housings, and other devices used to house routing cables and/or drop wires. Terminals may be polygon or non-polygon shaped and constructed of any appropriate material, such as, for example, metal, polymer, plastic, ceramic, glass, crystal, and/or combinations thereof. Typically, the terminal is mounted on a telephone pole, on a wall, or on another elevated structure providing access to the routing cable(s). The routing cable is separated at one of the ends into individual routing wires, and an end of a routing wire is mated in the terminal on a terminal block with an end of the drop wire. Each drop wire is usually mounted in a passageway (e.g., a bore, channel, groove, or any other similar structure) formed through the terminal. The drop wire is further routed out of the passageway and then to the location (e.g., customer's home or business located at an address) associated with the called telephone number. A conventional aerial terminal is described in U.S. Pat. No. 5,323,454 of which the "Background of the Invention" section is incorporated herein by this reference.

Telephone technicians, such as repairpersons and installers, often gain access to the terminals by climbing the telephone poles or using a ladder to reach the elevated position where the terminal is mounted. Conventional aerial terminals are rigidly attached to the telephone pole or wall and may be difficult for the technician to reach if the technician is positioned at an alternate location on the pole or wall from the terminal. For example, if there is a fence blocking a ground area of the terminal side of the telephone pole, the technician must place the ladder on a ground area of a non-terminal side, climb up, and bend around the pole to gain access to the terminal. Further, the technician does not have a great deal of room to work and frequently uses one hand to assist in securing a fixed position above the ground, thus making it more difficult for the technician to gain access to the terminal when it is located at an alternate location on the pole.

Accordingly, it is highly desirable to have an adjustable aerial terminal that provides many features of conventional aerial terminals while providing an individual, such as a technician, with greater access to the terminal and more useable work space.

SUMMARY OF THE INVENTION

This invention addresses the above-described and other needs by providing an adjustable aerial terminal that is capable of being pole-mounted or wall-mounted. This invention provides for a telecommunications terminal having a means to adjust positions to provide a technician with greater access to the terminal and the like contained within the terminal. Further, the telecommunications terminal includes means to securely position or engage a select location along (or about a track when the technician is not working on the terminal.

In an embodiment, this invention includes an aerial terminal having a means to rotationally adjust positions about a curved surface, such as a pole. In another embodiment, this invention includes an aerial terminal having a means to longitudinally adjust positions about or along a planar surface, such as a wall. In another embodiment, this invention includes a kit-of-parts capable of being assembled with conventional aerial terminals such that the resulting apparatus provides an adjustable aerial terminal as described in the above embodiments. Still further, this invention provides for a method of adjusting aerial terminals located at an elevated position that includes mounting the aerial terminal with a base member having means to engage a track, mounting the track, and engaging the base member with the track such that the aerial terminal can adjust positions along or about the track.

BRIEF DESCRIPTION OF THE DRAWINGS

The above and other embodiments, objects, uses, advantages, and novel features of this invention are more clearly understood by reference to the following description taken in connection with the accompanying figures, in which.

DETAILED DESCRIPTION OF THE INVENTION

This invention now will be described more fully hereinafter with reference to the accompanying drawings, in which exemplary embodiments are shown. This invention may, however, be embodied in many different forms and should not be construed as limited to the embodiments set forth herein; rather, these embodiments are provided so that this disclosure will be thorough and complete, and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Thus, for example, it will be appreciated by those skilled in the art that the schematics and the like represent conceptual views of illustrative structures embodying this invention.

In the claims hereof any element expressed as a means for performing a specified function is intended to encompass any way of performing that function including, for example, a combination of elements that performs that function. The invention as defined by such claims resides in the fact that the functionalities provided by the various recited means are combined and brought together in the manner that the claims call for. Applicant thus regards any means that can provide those functionalities as equivalent as those shown herein.

This invention is directed to an adjustable aerial terminal that provides capabilities for adjusting the position of the aerial terminal by means of tracks mounted on a surface that mate with and engage base members attached to the aerial terminal. This invention also provides for a locking mechanism to fix or secure the aerial terminal at a selected position, such as when the aerial terminal is not being worked on or serviced by a technician. Further, this invention includes the adjustable aerial terminal, a kit-of-parts for converting a conventional aerial terminal to an adjustable aerial terminal, and a method of adjusting the adjustable aerial terminal to a selected position.

Figure 1A:
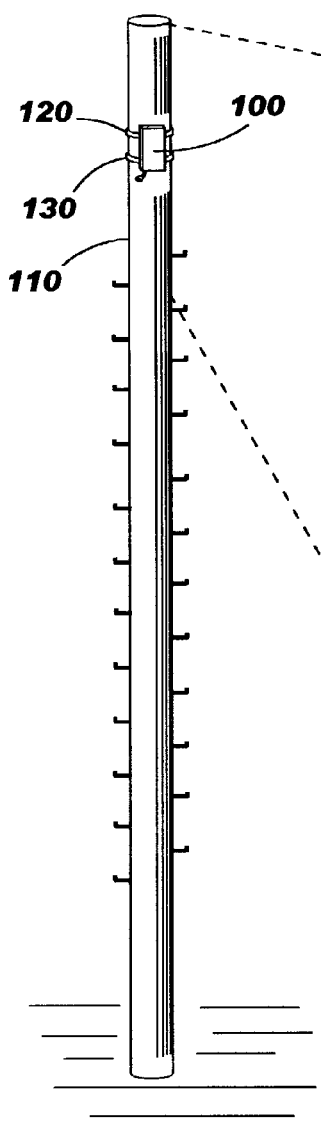
FIG. 1A is a perspective view of a telecommunications pole with an adjustable aerial terminal according to an embodiment of this invention.
Figure 1B:
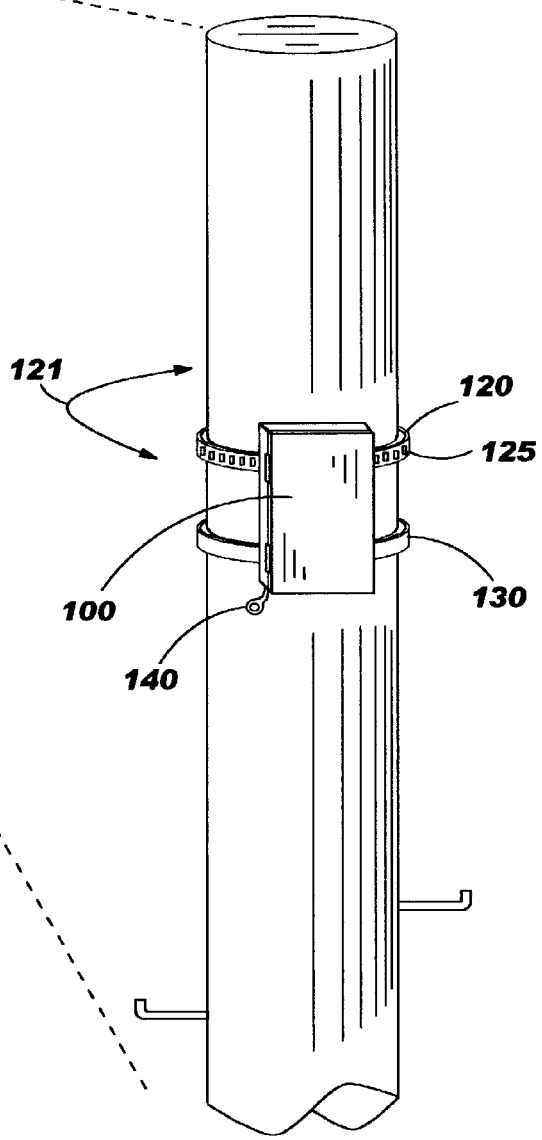
FIG. 1B is a partial exploded perspective view illustrating a configuration of the aerial terminal of FIG. 1A engaged with tracks mounted to the telecommunications pole.

As shown in FIGS. 1A–B, the design of an adjustable aerial terminal 100 is based on conventional designs of pole or wall mounted aerial terminals. One advantage of using conventional terminal designs is that it illustrates a variety of aerial terminals, even those already installed in the field, that can easily be upgraded to an adjustable aerial terminal 100. Frequently, these upgrades can be made without disturbing the connections between the routing cable and/or wires and the drop wires of the existing aerial terminal structure. The upgrades are typically made by removing the mounting elements of the existing aerial terminal, ensuring that the cables and wires have enough slack for movement on or along the desired travel path, and by adding tracks (such as tracks 120, 130 shown in FIGS. 1A–1B) and base members (such as base members 150, 152, 154, 156 shown in FIG. 3A to provides means for adjusting the position of the aerial terminal on, along, or about a position of the tracks.

Figure 4:
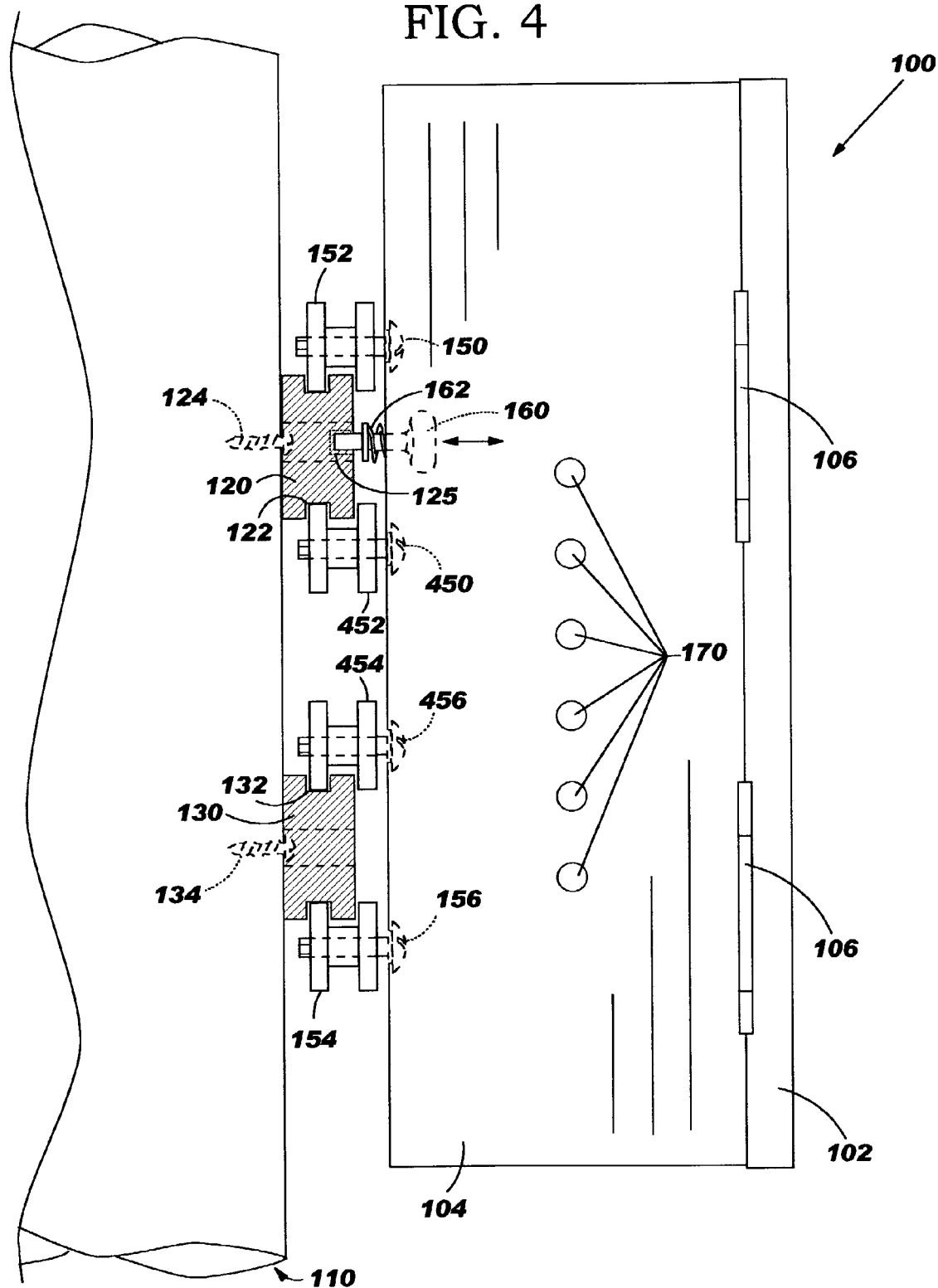
FIG. 4 is a perspective side view illustrating another configuration of the tracks engaged with the base members and the lock-pin pulling handle according to an alternate embodiment of this invention.
Figure 5:
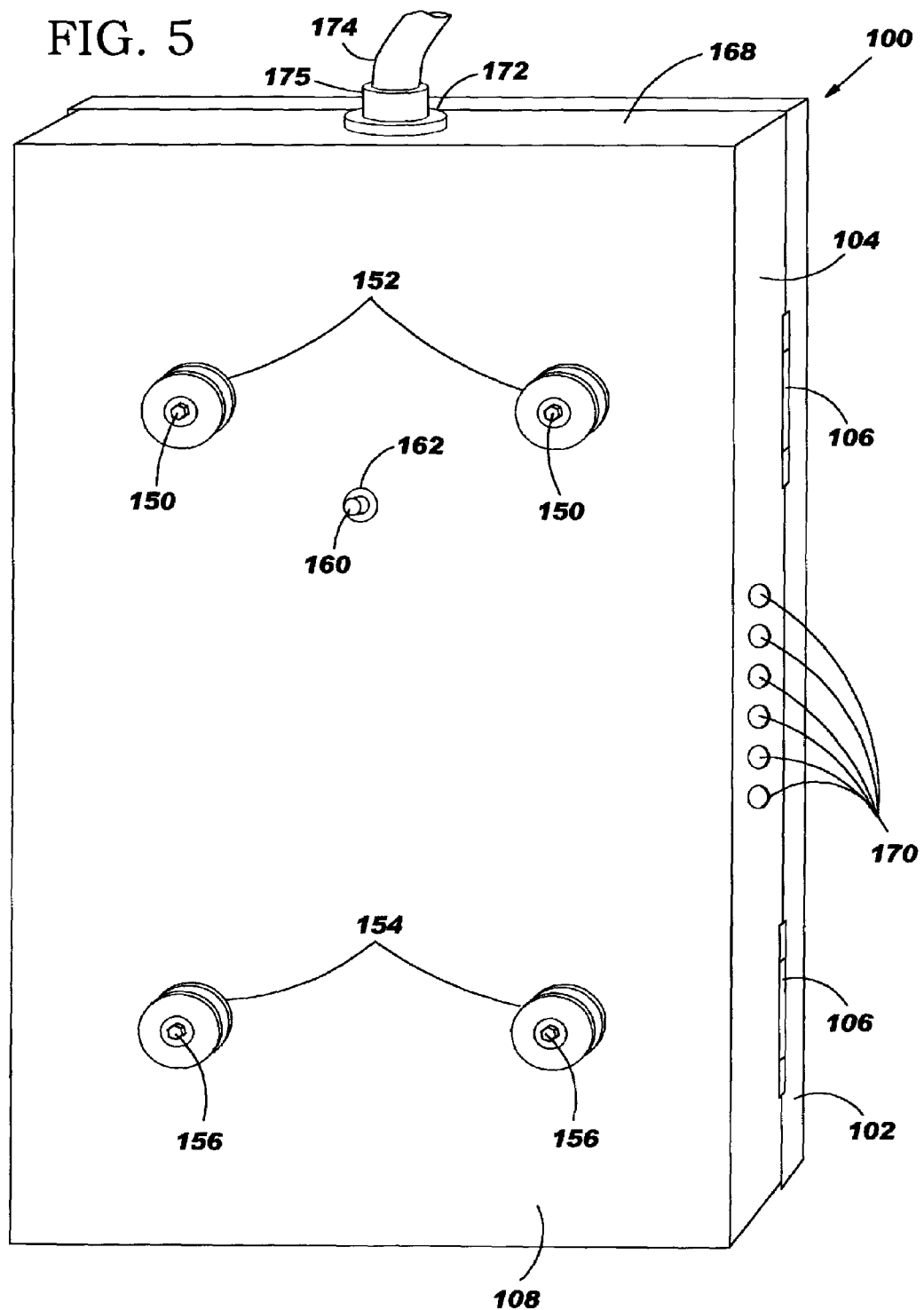
FIG. 5 is a perspective rear view of the aerial terminal of FIG. 1B.
Figure 6:
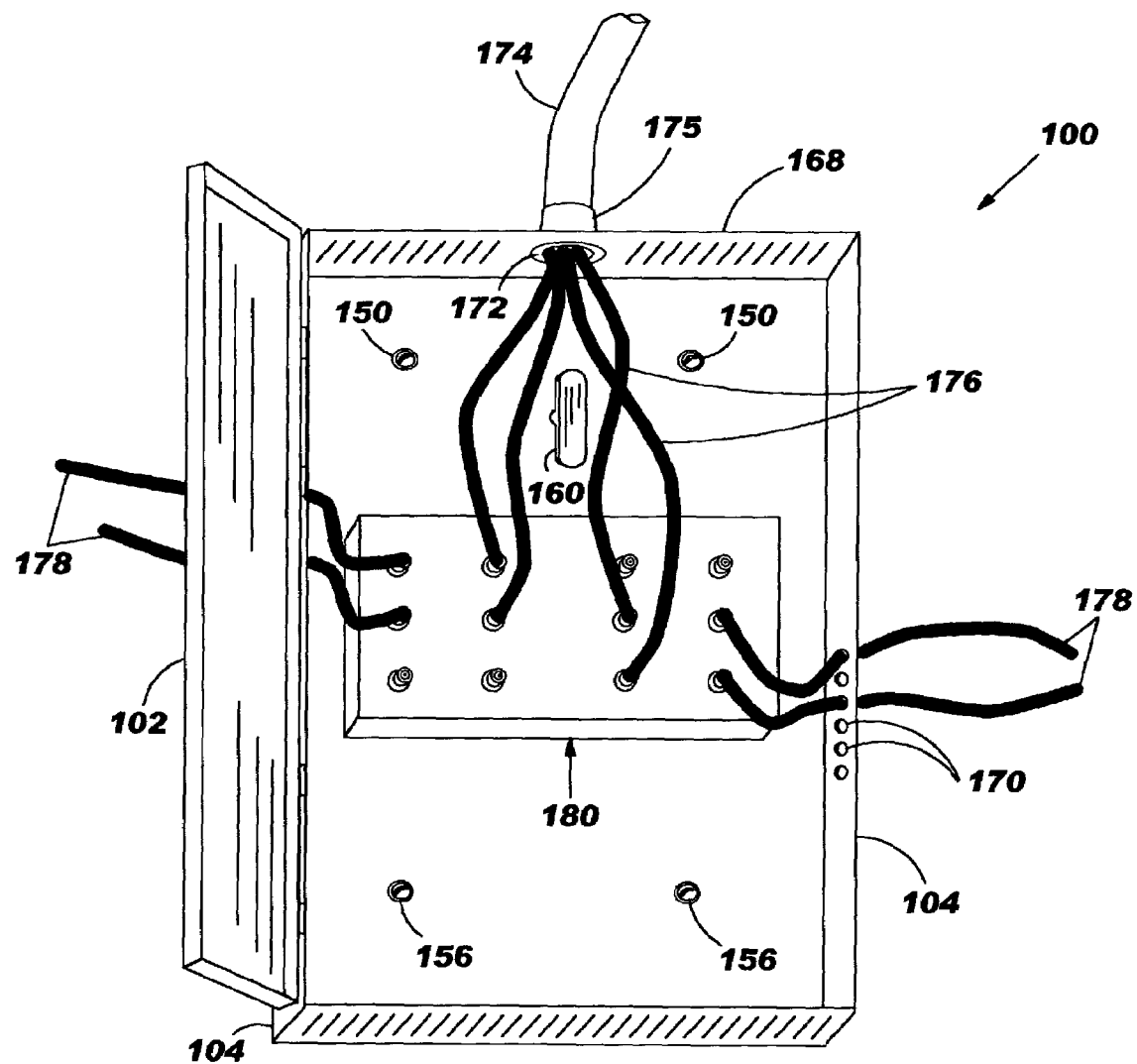
FIG. 6 is a perspective view of the aerial terminal of FIG. 1B illustrating an open position of the cover section and the contents therein.

FIGS. 1A–6 illustrate an adjustable aerial terminal 100 mountable to a telecommunications pole 110 by means of tracks 120, 130 and by various engagement means, shown as base members 150, 152, 154, 156, 450,452, 454, and 456. The adjustable aerial terminal 100 includes a cover section 102 that is securable to a housing section 104 in a manner permitting it to be opened (as shown in FIG. 6) to provide access to at least one terminal block (shown as reference number 180 is FIG. 6) interconnecting at least one routing wire of a routing cable and at least one drop wire (shown respectively as reference numbers 176, 174, and 178 in FIG. 6). As depicted, the adjustable aerial terminal 100 has a rectangular or square-shape; however, as one of ordinary skill in the art appreciates, the adjustable aerial terminal 100 may take on a variety of shapes, such as cylindrical, triangular, trapezoidal, and combinations thereof. Further, the adjustable aerial terminal 100 may be manufactured using any appropriate material that can withstand environmental conditions, such as, a wide range of temperatures and humidity. For example, the cover section 102 and housing section 104 can be formed of sheets of G90 galvanized steel having a durable finish coating, such as polyurethane powder. Alternatively, the adjustable aerial terminal 100 could be constructed of other appropriate metal, polymer, plastic, ceramic, glass, crystal, and combinations thereof.

Preferably, the cover section 102 is secured to housing section 104 with a hinged portion 106 so that an environmental-proof container (e.g., waterproof, rodent-proof, etc.) for telecommunications terminals is formed. While the hinged portion 106 is shown connecting the cover section 102 to a side wall of the housing section 104, the hinged portion may be located at alternative locations so long as access is provided to the internal components of the adjustable aerial terminal. The adjustable aerial terminal 100 may also include a cover fastener section (not shown) to secure the cover section 102 in its closed position as shown in FIG. 1B. Further, the hinged portion 106 may attach the cover section 102 and housing section 104 through a variety a hinging types, such as an integral "living" type or a pintle-type hinge of the sort commonly used with door hinges. Depending on the type of hinge, it may include nuts, bolts, screws, rivets, welding, and the like.

As FIGS. 5 and 6 show, a rear wall 108 of the adjustable aerial terminal 100 includes at least one mounted terminal block 180 that receives at least one individual routing wire 176 of a routing cable 174 for interconnection with at least one drop wire 178. An end of the routing cable 174 enters an upper wall 168 of the adjustable aerial terminal 100 for interconnection with the drop wire(s). A conventional grommet assembly 175 may be used to seal opening 172 around the routing cable 174 and may serve to clamp the cable insulation for strain relief to protect termination of the routing wires 176. Individual drop wire openings 170 through opposing side walls (not labeled) of housing section 104 are shown extending in a vertical linear array for receipt of ends of individual drop wires 178 from opposing sides of the adjustable aerial terminal. Although not illustrated, the adjustable aerial terminal 100 may further include a ground wire that typically extends to the ground. The routing cable 174 and drop wires 178 (and, if applicable, ground wire) commonly are clamped to the pole 110 or other surface (e.g., a wall of a building) with enough slack to allow the adjustable aerial terminal 100 to travel along or about the tracks (shown as reference numerals 120, 130 in FIGS. 1A and 1B) without damaging the routing cable 174 and drop wires 178. Further, sealing strips or alternate sealing mechanisms (not shown) are typically located within or about the drop wire openings 170 to provide an environmental seal and protect the routing of the drop wires 178. In addition, the adjustable aerial terminal 100 may include a hooking device 140 as shown in FIG. 1B that allows an individual to adjust the position of the aerial terminal without opening the cover section 102.

Figure 2:
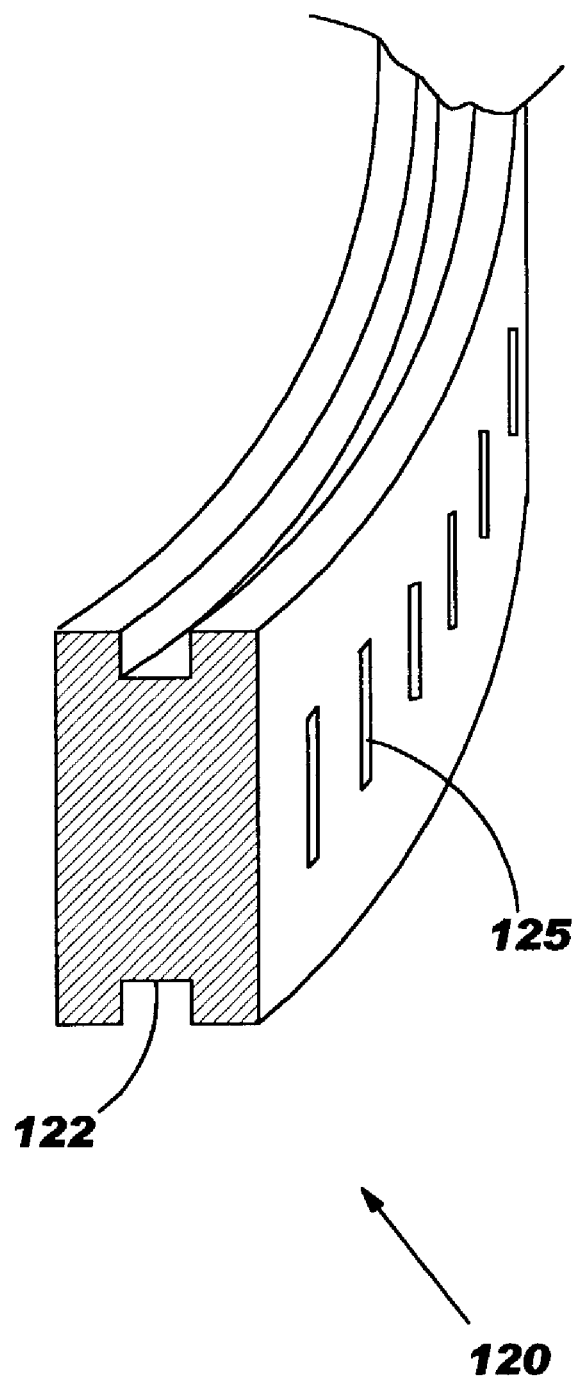
FIG. 2 is a partial cross-section perspective view of the upper track of FIG. 1B.
Figure 3A:
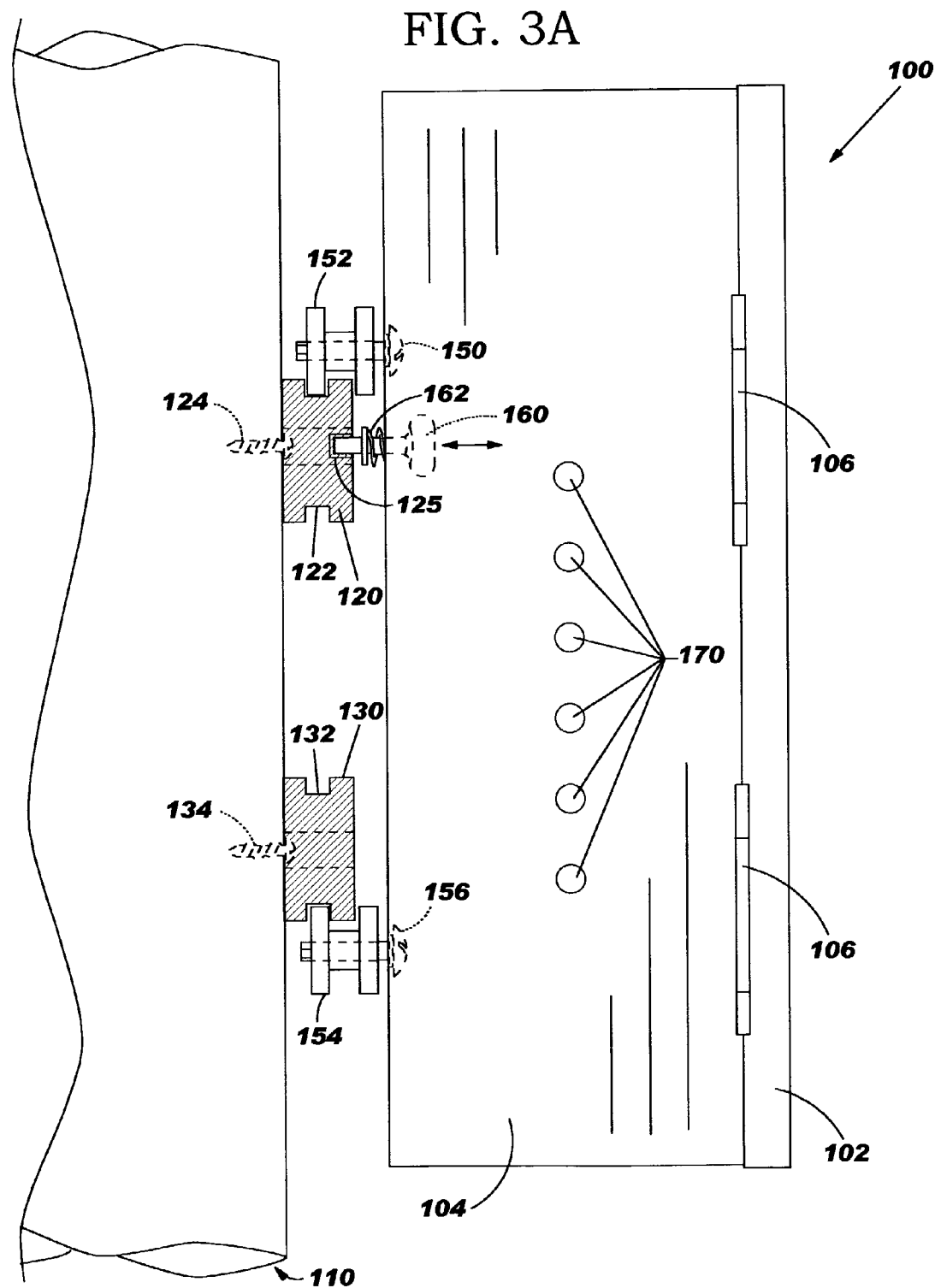
FIGS. 3A–3B are perspective side views of the apparatus of FIG. 1B illustrating configurations of the tracks engaged with the base members and the lock-pin pulling handle according to embodiments of this invention.
Figure 3B:
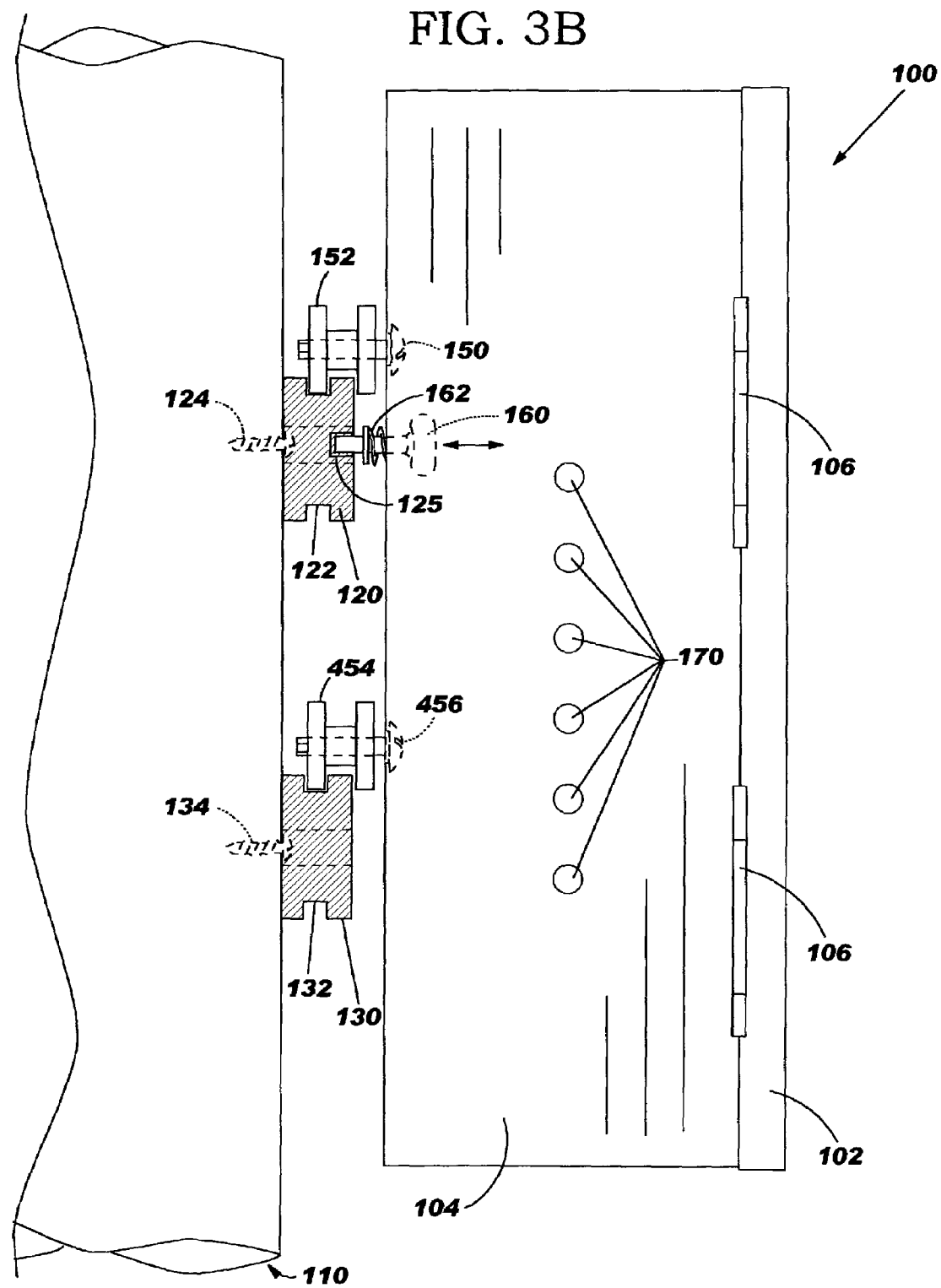

Referring now to an embodiment of the track and base member assembly of this invention, FIG. 1B shows tracks 120, 130 extending about the circumference of telecommunications pole 110. The adjustable aerial terminal 100 may travel about the pole in the direction of arrow 121 (e.g., circumferentially about the pole). The tracks 120, 130 may extend about the entire circumference of the pole 110 or about a portion of the circumference of the pole 110. A cross-section of track 120 is shown in FIG. 2 to further illustrate upper and lower rotational surface passageways 122 upon which a rotatable wheel (shown as reference numeral 152 in FIG. 3A) of the base assembly may be located to travel about the pole 110. As FIGS. 3A, 3B, and 4 show, fasteners 124, 134 extend through body sections of tracks 120, 130 and thread into the pole 110 at various locations about the circumference of the pole 110 such that the tracks 120, 130 are secured about the circumference of the pole 110. Alternatively, other fastening devices may be used to secure tracks 120, 130 to the pole 110 as long as the fastening devices are strong enough to support the weight of the adjustable aerial terminal 100 and its components. Tracks 120, 130 may be made of any appropriate material including metal, polymer, plastic, ceramic, glass, crystal, and combinations thereof. The tracks may be curved, flexible, or otherwise designed such that they are capable of extending about a curved surface. Further, if the tracks 120, 130 are made from plastic or other non-conductive material, a grounding strip or other grounding component (not shown) may be necessary to ground the tracks. When the tracks 120, 130 are made from a conductive material, an existing ground (not shown) of the aerial terminal may be used to ground the tracks 120, 130.

As further illustrated in FIG. 2, track 120 includes locking grooves 125 located in multiple positions along or about track 120. A locking pin assembly including the pull handle 160 and spring assembly 162 shown in FIGS. 3A, 3B, and 4 may be used to fix or secure the adjustable aerial terminal 100 at a position of a selected locking groove 125 by mating in a male-female relationship. A technician or other individual can disengage the locking pin assembly 160, 162 and locking groove 125 by pulling on the pull handle 160.

FIG. 3A is a side view of an embodiment illustrating an upper wheel 152 of the adjustable aerial terminal 100 engaging an upper portion of track 120 in the upper rotational surface passageway 122 and a lower wheel 154 of the adjustable aerial terminal 100 engaging a lower portion of track 130 in lower rotational surface passageway 132. The wheels 152, 154 engage the passageways 122, 132 of the tracks 120, 130 such that the adjustable aerial terminal 100 is mounted upon the tracks 120, 130 attached to the pole 110. FIG. 3B is a side view of an embodiment illustrating an upper wheel 152 of the adjustable aerial terminal 100 engaging an upper portion of track 120 in the upper rotational surface passageway 122 and a lower wheel 454 of the adjustable aerial terminal 100 engaging an upper portion of track 130 in upper rotational surface passageway 132. The wheels 152, 454 engage the passageways 122, 132 of the tracks 120, 130 such that the adjustable aerial terminal 100 is mounted upon the tracks 120, 130 attached to the pole 110 and such that the weight of the adjustable aerial terminal 100 is distributed to the upper rotational surface passageways 122, 132 and to the upper portions of tracks 120, 130. FIG. 4 illustrates an alternate embodiment showing additional base members engaging the tracks 120, 130. As shown in FIG. 4, the upper wheel 152 and a companion upper wheel 452 engage upper and lower rotational surface passageways 122 of track 120 and the lower wheel 154 and a companion lower wheel 454 engage upper and lower rotational surface passageways 132 of track 130 such that each track has a pair of wheels positioned about it.

FIG. 5 is a back view of the adjustable aerial terminal 100 showing the configuration of base members 150, 152, 154, and 156 and locking mechanism 160, 162.

FIG. 6 is a front view of the adjustable aerial terminal 100 with the cover section open and showing the configuration of base members 150, 152, 154, and 156 and locking mechanism 160, 162. While FIGS. 5–6 depict threadable screw assemblies 150, 156 extending through the back wall 108 to attach wheels 152, 154, alternate attachment devices may be used to attach wheels 152, 154 to the adjustable aerial terminal 100. Similarly, while the locking mechanism 160, 162 is shown as a pull handle 160 and spring assembly 162, alternate locking devices may be used to fix or secure the position of the terminal 100 to tracks 120, 130 or to the pole (or other surface that the tracks may be attached to as shown in FIGS. 7–8).

In addition to the above embodiments related to a pole-mounted adjustable aerial terminal 100 (FIGS. 1A–1B, and 2–6), this invention also applies to a variety of adjustable aerial terminals that are mounted to other elevated surfaces, such as walls.

Figure 7:
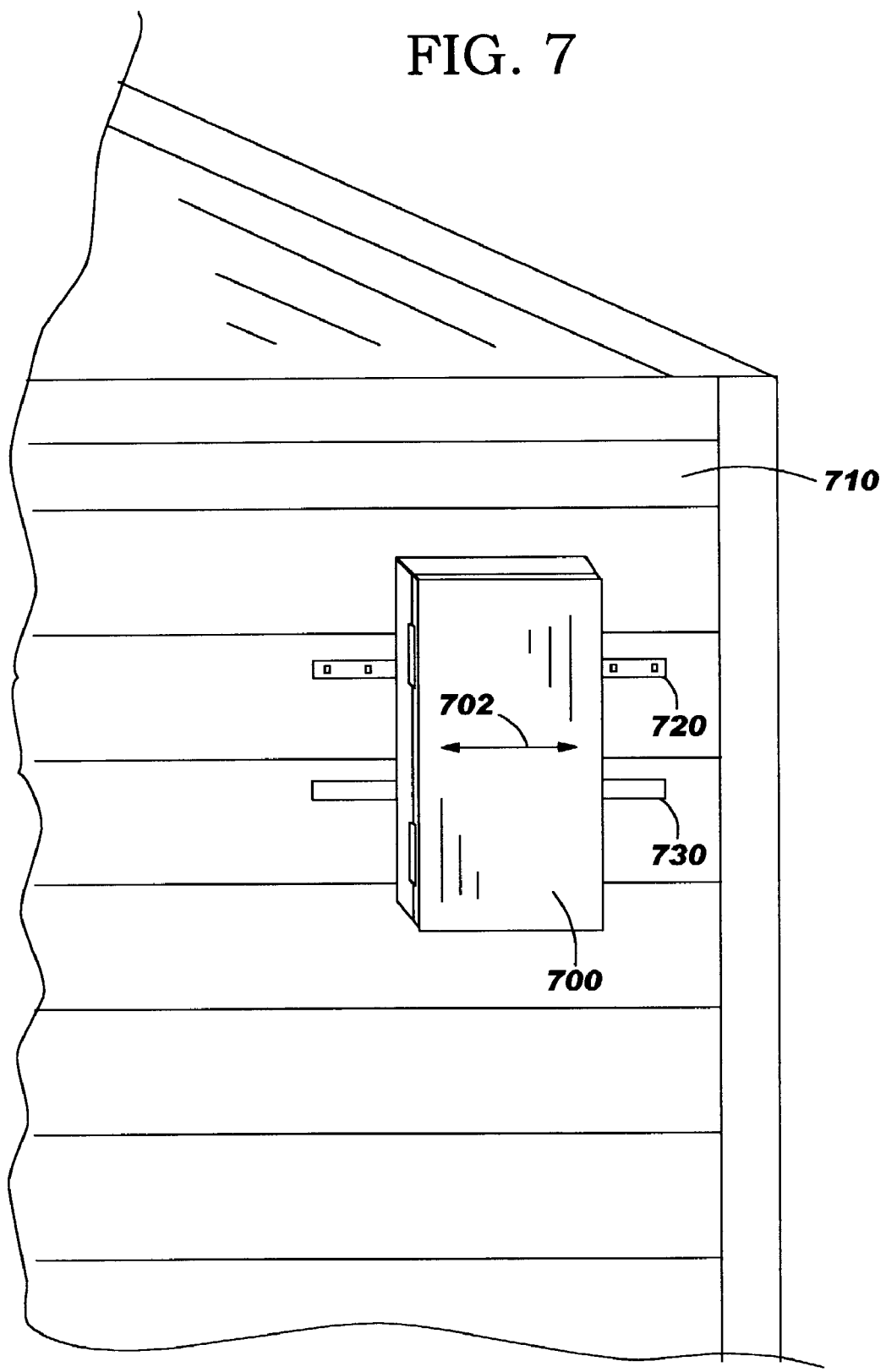
FIGS. 7–8 are perspective views of wall-mounted adjustable aerial terminals according to alternate embodiments of this invention.
Figure 8:
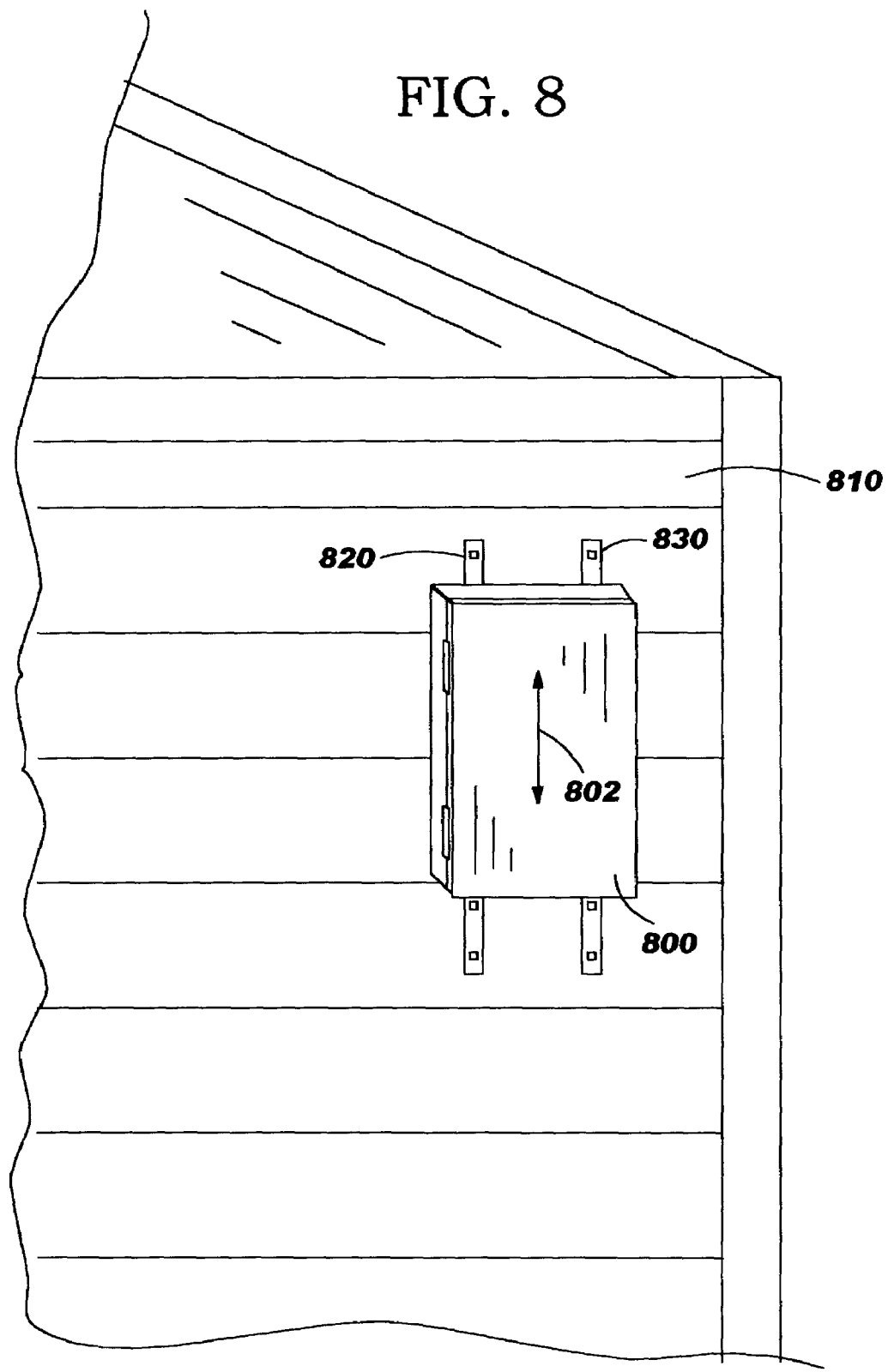

FIG. 7 illustrates an adjustable aerial terminal 700 that engaging tracks 720, 730 mounted upon building 710. The adjustable aerial terminal 700 travels along a horizontal path of tracks 720, 730 as depicted by line 702. FIG. 8 illustrates an adjustable aerial terminal 800 that engaging tracks 820, 830 mounted upon building 810. The adjustable aerial terminal 800 travels along a vertical path of tracks 820, 830 as depicted by line 802.

Figure 9:
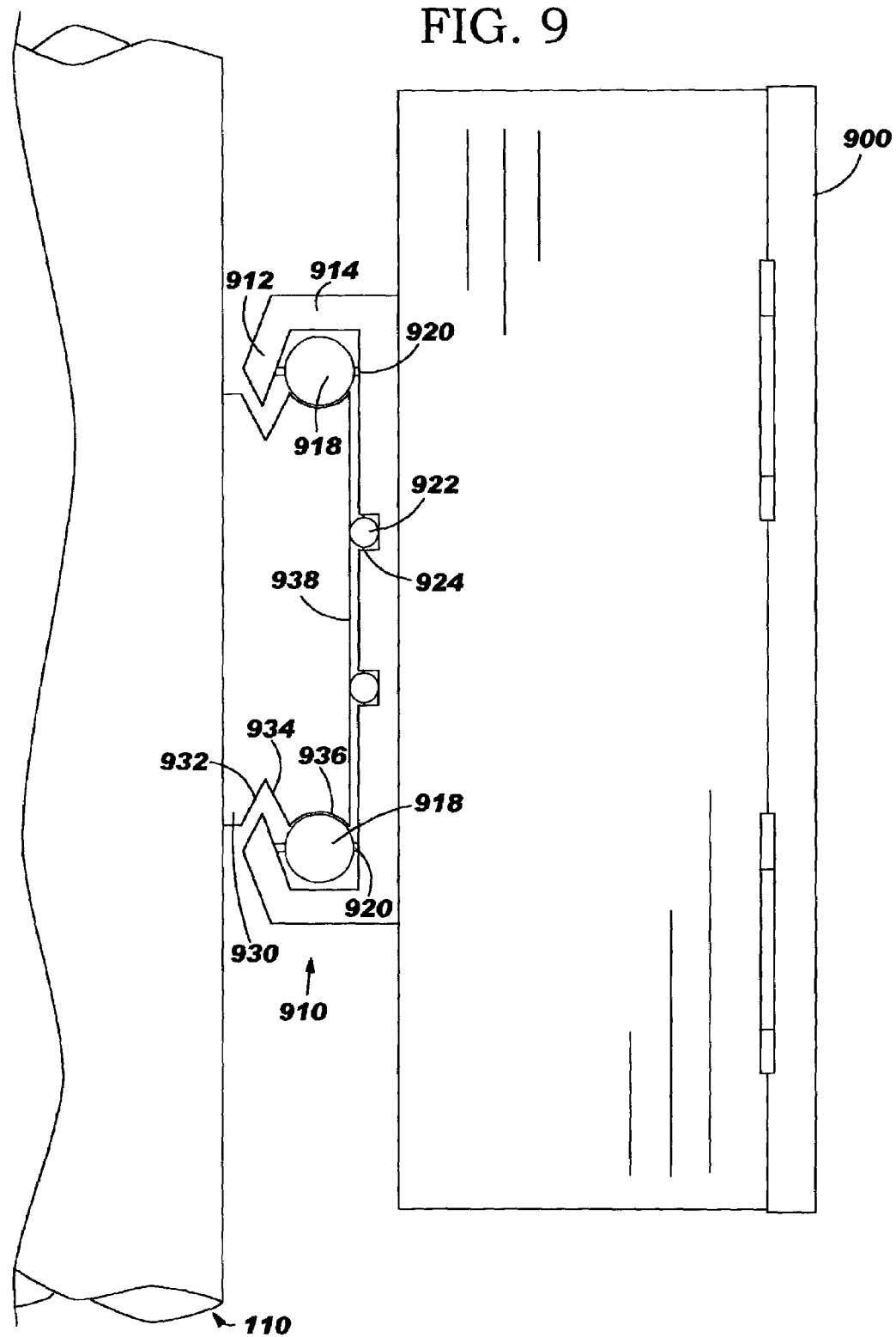
FIGS. 9–13 are perspective views of alternate engagement configurations for tracks and base members according to alternate embodiments of this invention.
Figure 10:
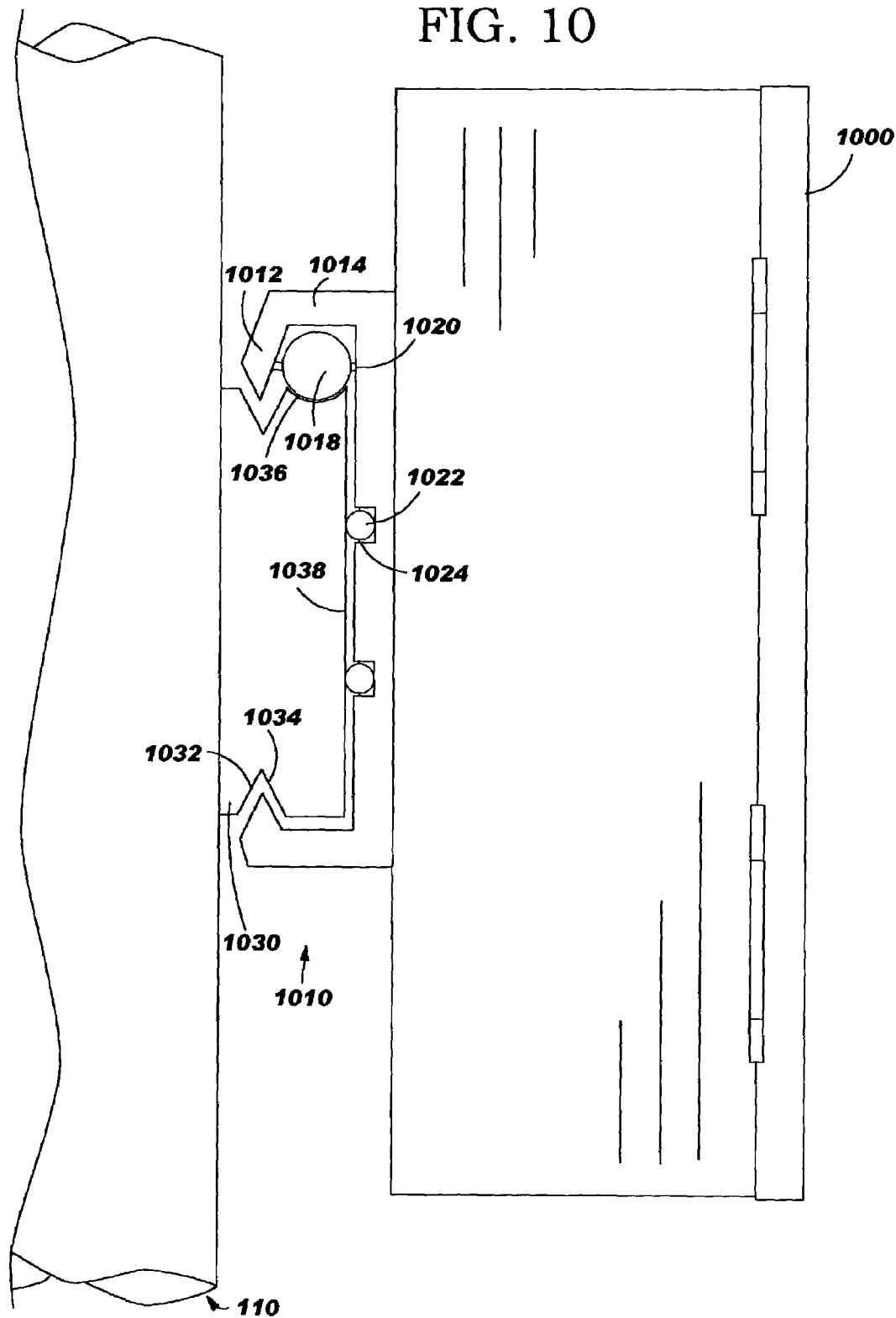
Figure 11:
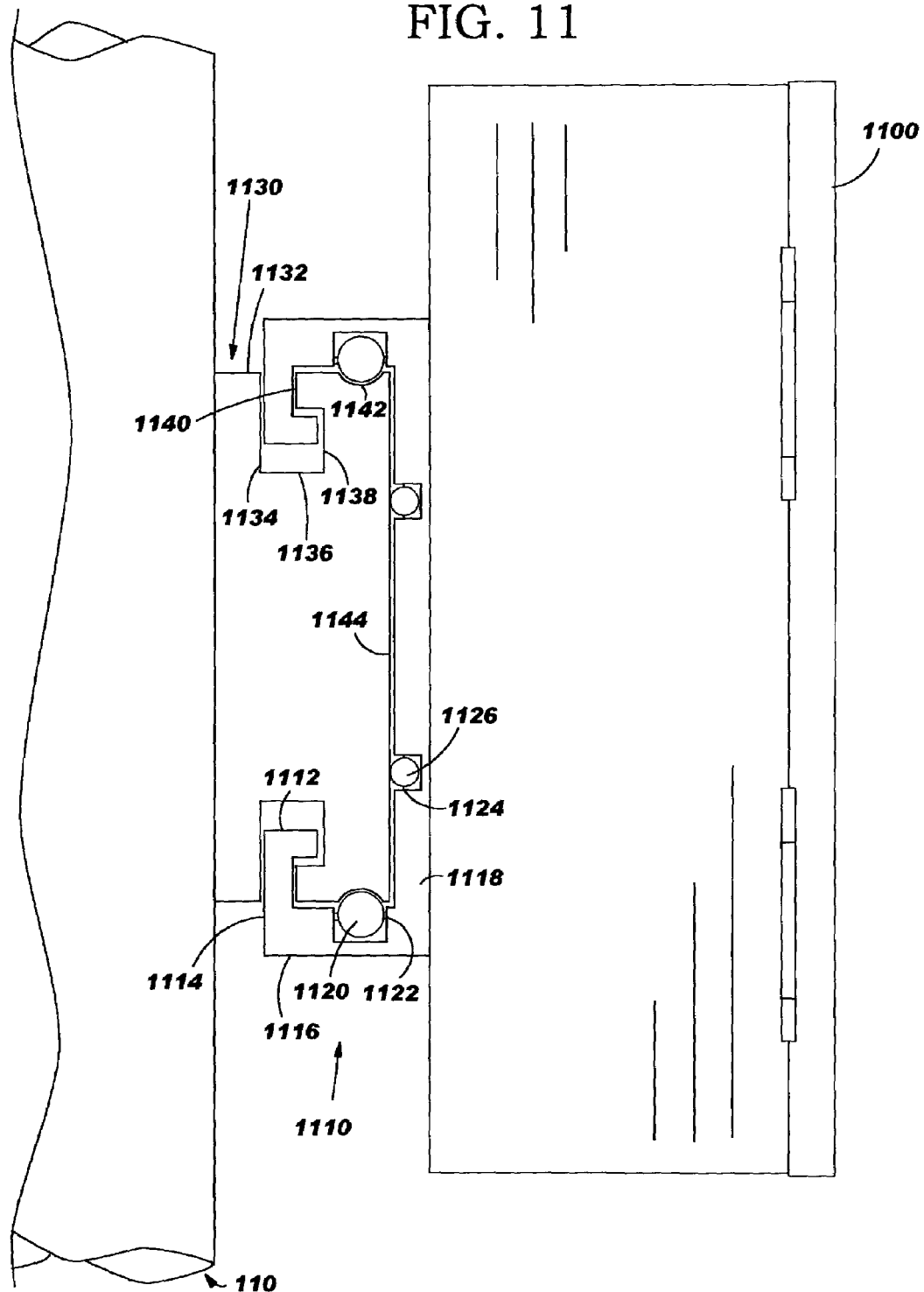

FIGS. 9–11 illustrate alternate engagement configurations for tracks and base members according to further embodiments of this invention that utilize wheeled assemblies, raised surfaces and complimentary passageway, and combinations thereof.

FIG. 9 illustrates a cross-section view of an adjustable aerial terminal 900 having a base member 910 including a plurality of surfaces 912, 914, 916 and rotational components 918, 922 that engage track 930 including a plurality of surfaces and rotational surface passageways 932, 934, 936, 938. Rotational components 918, 922 may be mounted by respective mounting components 920, 924. Alternatively, the outer lateral sides of the base member 910 may be enclosed such that the rotational components 918, 920 are enclosed and do not need mounting components. FIG. 10 illustrates a further embodiment similar to the apparatus shown in FIG. 9; however, the apparatus of FIG. 10 does not include lower rolling element 918 or lower mounting element 920. Further, in FIG. 10, the lower curved rotational surface passageway 936 is shown as a substantially flat surface.

Figure 12:
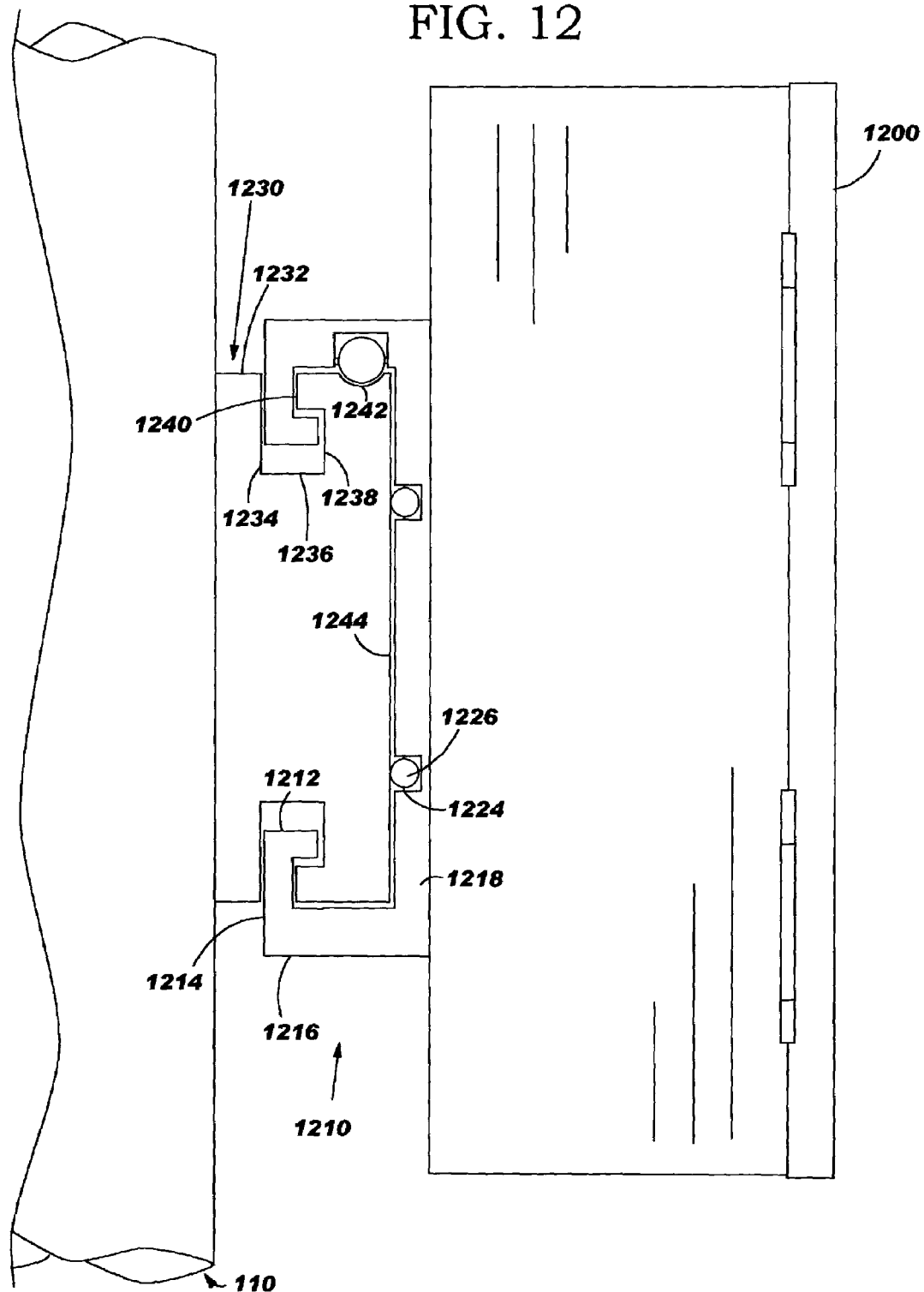

FIG. 11 illustrates a cross-section view of an adjustable aerial terminal 1100 having a base member 1110 including a plurality of surfaces 1112, 1114, 1116, 1118 and rotational components 1120, 1126 that engage track 1130 including a plurality of surfaces and rotational surface passageways 1132, 1134, 1136, 1138, 1140, 1142, 1144. Rotational components 1120, 1126 may be mounted by respective mounting components 1122, 1124. Alternatively, the outer lateral sides of the base member 1110 may be enclosed such that the rotational components 1120, 1126 are enclosed and do not need mounting components. FIG. 12 illustrates a further embodiment similar to the apparatus shown in FIG. 11; however, the apparatus of FIG. 12 does not include lower rolling element 1120 or lower mounting element 1122. Further, in FIG. 12, the lower curved rotational surface passageway 1142 is shown as a substantially flat surface.

Figure 13:
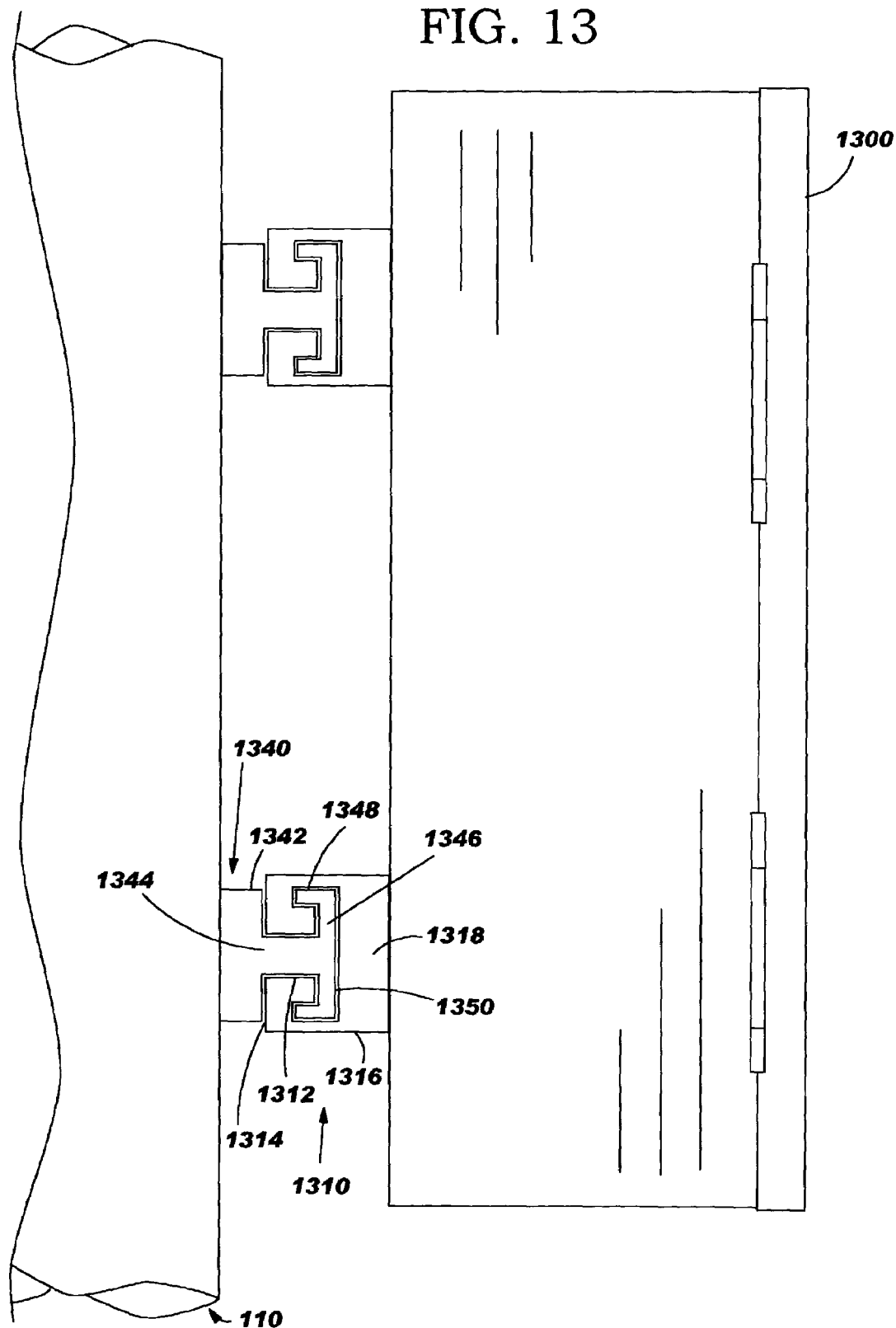

Finally, FIG. 13 illustrates a cross section of an adjustable aerial terminal 1300 having a pair of identical base members 1310 including a plurality of raised and recessed surfaces 1312, 1314, 1316, 1318 that engage track 1340 including a plurality of complimentary raised and recessed surfaces 1342, 1344, 1346, 1348, 1350.

In another embodiment, this invention includes a kit-of-parts capable of being assembled with conventional aerial terminals such that the resulting apparatus provides an adjustable aerial terminal as described in the above embodiments. Still further, this invention provides for a method of adjusting aerial terminals located at an elevated position that includes providing the aerial terminal with a base member having means to engage a track, mounting the track, and engaging the base member with the track such that the aerial terminal is supported by the track and can adjust positions along or about the track.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An aerial terminal, comprising:
    a housing section having a plurality of walls, the housing section for containing at least one of a routing cable and a drop wire; and
    means for engaging a track whereby the aerial terminal is movable about the track, the means for engaging the track comprising at least one rotational base member having a rotational surface for mating with a complimentary rotational surface passageway of the track and the means for engaging the track further comprising a position locating base member for mating with a complimentary notched surface passageway of the track.

2. The aerial terminal of claim 1, the position locating base member comprising a locking pin engagement base member having a spring assembly and a longitudinally extending pin having a pull handle at one end and a positioning end at the other end.

3. The aerial terminal of claim 2, further comprising:
    the track, the track comprising a first elongated bar having the complimentary rotation surface passageway and a second elongated bar having the complimentary notched surface passageway and further comprising means for mounting the track upon a surface.

4. The aerial terminal of claim 3, the means for mounting the track upon a surface comprising means for mounting the track upon a planar surface.

5. The aerial terminal of claim 4, the at least one rotation base member comprising a pair of aligned wheels for rolling along the complimentary rotation surface passageway.

6. The aerial terminal of claim 5, the aerial terminal movable about a longitudinal axis of the track when the pull handle of the locking pin engagement base member is pulled such that the positioning end is not mated with the complimentary notched surface passageway.

7. The aerial terminal of claim 3, the means for mounting the track upon a surface comprising means for mounting the track upon a cylindrical surface.

8. The aerial terminal of claim 7, the aerial terminal movable about a portion of a circumference of the cylindrical surface along the track when the pull handle of the locking pin engagement base member is pulled such that the positioning end is not mated with the complimentary notched surface passageway.

9. The aerial terminal of claim 8, the at least one rotation base member comprising a pair of aligned wheels for rolling along the complimentary rotation surface passageway.

10. The aerial terminal of claim 2, further comprising:
    a hook portion, the hook portion affixed to an outer portion of one of the plurality of walls of the housing section, the hook portion capable of allowing a force to be applied to move the aerial terminal about the track when the positioning end of the locking pin engagement base member is not mated with the complimentary notched surface passageway.

11. A kit-of-parts for an serial terminal, comprising:
    a base member attachable to the aerial terminal, the base member comprising means for engaging a track whereby the aerial terminal is movable about the track, the means for engaging the track comprising at least one rotational base member having a rotational surface for mating with a complimentary rotational surface passageway of the track and the means for engaging the track further comprising a position locating base member for mating with a complimentary notched surface passageway of the track.

12. The kit-of-parts for the aerial terminal of claim 11, the position locating base member comprising a locking pin engagement base member having a spring assembly and a longitudinally extending pin having a pull handle at one end and a positioning end at the other end.

13. The kit-of-parts for the aerial terminal of claim 12, further comprising:
    the track, the track comprising a first elongated bar having the complimentary rotation surface passageway and a second elongated bar having the complimentary notched surface passageway and further comprising means for mounting the track upon a surface.

14. A method of adjusting an aerial terminal, comprising:
    attaching the aerial terminal to a base member attachable to a housing section of the aerial terminal, the base member comprising means for engaging a track comprising at least one rotational base member having a rotational surface for mating with a complimentary rotational surface passageway of the track and the means for engaging the track further comprising a position locating base member for mating with a complimentary notched surface passageway of the track; and mounting the aerial terminal to the track wherein the aerial terminal is movable about the track.

15. The method of claim 14, the position locating base member comprising a locking pin engagement base member having a spring assembly and a longitudinally extending pin having a pull handle at one end and a positing end at the other end.

16. The method of claim 14, further comprising:
moving the aerial terminal about the track.

17. The method of claim 14, further comprising:
mounting the track upon a non planar surface.

18. The method of claim 14, further comprising:
mounting the track to a telecommunications pole.

19. The method of claim 14, further comprising:
mounting the track upon a planar surface.

20. A method of adjusting an aerial terminal, comprising:
utizing means for engaging a track of an aerial terminal to move the aerial terminal about the track, the means for engaging the track comprising at least one rotational base member having a rotational surface for mating with a complimentary rotational surface passageway of the track and the means for engaging the track further comprising a locking pin engagement base member comprising a spring assembly and a longitudinally extending pin having a pull handle at one end and a positioning end at the other end for mating with a complimentary notched surface passageway of the track.

* * * * *